US011048952B2

(12) United States Patent
Osuga et al.

(10) Patent No.: US 11,048,952 B2
(45) Date of Patent: Jun. 29, 2021

(54) OCCUPANT MONITORING DEVICE, OCCUPANT MONITORING METHOD, AND OCCUPANT MONITORING PROGRAM

(71) Applicant: AISIN SEIKI KABUSHIKI KAISHA, Kariya (JP)

(72) Inventors: Shin Osuga, Nagoya (JP); Takashi Kato, Aichi-ken (JP); Yuya Yamada, Tokyo (JP); Tetsuya Hattori, Kariya (JP); Yoshiyuki Yamada, Kariya (JP); Yuta Kawai, Kuwana (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 7 days.

(21) Appl. No.: 16/580,593

(22) Filed: Sep. 24, 2019

(65) Prior Publication Data

US 2020/0104615 A1    Apr. 2, 2020

(30) Foreign Application Priority Data

Sep. 27, 2018   (JP) .............................. JP2018-181985

(51) Int. Cl.
*G06K 9/00* (2006.01)
*G06T 7/70* (2017.01)
(Continued)

(52) U.S. Cl.
CPC ..... *G06K 9/00845* (2013.01); *G06K 9/00228* (2013.01); *G06K 9/00255* (2013.01);
(Continued)

(58) Field of Classification Search
CPC .......... G06K 9/00845; G06T 7/70; G06T 7/20
See application file for complete search history.

(56) References Cited

U.S. PATENT DOCUMENTS

2007/0121094 A1*  5/2007  Gallagher .......... G06K 9/00201
                                                   356/4.03
2009/0102788 A1*  4/2009  Nishida ................... G06F 3/017
                                                   345/158
(Continued)

FOREIGN PATENT DOCUMENTS

JP        2010-97379 A      4/2010
JP        2013-252301 A    12/2013

OTHER PUBLICATIONS

U.S. Appl. No. 16/580,562, filed Sep. 24, 2019, Shin Osuga, et al.
(Continued)

*Primary Examiner* — Edward Park
(74) *Attorney, Agent, or Firm* — Sughrue Mion, PLLC

(57) ABSTRACT

An occupant monitoring device includes: an acquisition unit that acquires a captured image obtained by imaging a region in which there is a probability that a face of an occupant is present in a vehicle; a determination unit that determines whether the captured image acquired by the acquisition unit corresponds to at least a first image not including a feature portion of the face of the occupant but including at least a part of a body of the occupant or a second image not including the body of the occupant; and a processing unit that monitors a state change of the face of the occupant based on the captured image, and switches whether or not an occupant parameter set for monitoring the state change of the face of the occupant is to be reset according to a determination result in the determination unit.

14 Claims, 9 Drawing Sheets

(51) Int. Cl.
*G06T 7/20* (2017.01)
*G06K 9/62* (2006.01)
*H04L 29/08* (2006.01)

(52) U.S. Cl.
CPC ....... *G06K 9/00362* (2013.01); *G06K 9/6256* (2013.01); *G06T 7/20* (2013.01); *G06T 7/70* (2017.01); *G06T 2207/20081* (2013.01); *G06T 2207/30201* (2013.01); *G06T 2207/30268* (2013.01); *H04L 67/12* (2013.01)

(56) References Cited

U.S. PATENT DOCUMENTS

| | | | |
|---|---|---|---|
| 2011/0068934 A1* | 3/2011 | Weng | A61B 5/18 |
| | | | 340/575 |
| 2019/0147270 A1* | 5/2019 | Aoi | G06K 9/00845 |
| | | | 382/118 |
| 2019/0340851 A1* | 11/2019 | Tokita | G07C 5/0841 |
| 2020/0005060 A1* | 1/2020 | Martin | G05D 1/0223 |
| 2020/0026938 A1* | 1/2020 | Nishimura | A61B 3/14 |
| 2020/0104615 A1* | 4/2020 | Osuga | G06T 7/70 |

OTHER PUBLICATIONS

Machine Translation of JP 2010-97379 of record. Cited Sep. 24, 2019.

\* cited by examiner

OCCUPANT MONITORING DEVICE, OCCUPANT MONITORING METHOD, AND OCCUPANT MONITORING PROGRAM

CROSS REFERENCE TO RELATED APPLICATIONS

This application is based on and claims priority under 35 U.S.C. § 119 to Japanese Patent Application 2018-181985, filed on Sep. 27, 2018, the entire contents of which are incorporated herein by reference.

TECHNICAL FIELD

This disclosure relates an occupant monitoring device, an occupant monitoring method, and an occupant monitoring program.

BACKGROUND DISCUSSION

In the related art, there is a technique of monitoring a state change of an occupant's face based on a captured image obtained by imaging the occupant's face of a vehicle. In the related art, an occupant monitoring process including detection of face information regarding the occupant's face (and tracking of the detected face information) is executed based on an occupant parameter that is adjusted as appropriate according to a detection result of the occupant's face reflected in a captured image.

In the related art, for example, in a case where an occupant is replaced, it is useful to reset the occupant parameter and readjust the occupant parameter from an initial value to cope with an occupant after replacement. Therefore, a timing of resetting the occupant parameter may be a timing at which a situation occurs in which, for example, a feature portion (the eyes, the nose, or the mouth) of the occupant's face is not detected from a captured image.

However, the situation in which a feature portion of the occupant's face is not detected from a captured image may occur not only in a case where an occupant is not present in a vehicle during replacement but also in a case where an occupant is present in the vehicle but is present at a position where a feature portion of the face is not reflected in the captured image. In the latter case, since an occupant is not replaced, when the occupant parameter is reset, for example, a wasteful process for readjusting the occupant parameter may be necessary, or the accuracy of an occupant monitoring process may be reduced.

Thus, a need exists for an occupant monitoring device, an occupant monitoring method, and an occupant monitoring program which are not susceptible to the drawback mentioned above.

SUMMARY

An occupant monitoring device as an example of this disclosure includes an acquisition unit that acquires a captured image obtained by imaging a region in which there is a probability that a face of an occupant is present in a vehicle; a determination unit that determines whether the captured image acquired by the acquisition unit corresponds to at least a first image not including a feature portion of the face of the occupant but including at least a part of a body of the occupant or a second image not including the body of the occupant; and a processing unit that monitors a state change of the face of the occupant based on the captured image, and switches whether or not an occupant parameter set for monitoring the state change of the face of the occupant is to be reset according to a determination result in the determination unit.

The occupant monitoring device can appropriately execute switching of whether or not an occupant parameter is to be reset according to whether a captured image corresponds to the first image or the second image, that is, whether or not a probability that replacement of an occupant may occur is high.

An occupant monitoring method as another example of this disclosure includes an acquisition step of acquiring a captured image obtained by imaging a region in which there is a probability that a face of an occupant is present in a vehicle; a determination step of determining whether the captured image acquired in the acquisition step corresponds to at least a first image not including a feature portion of the face of the occupant but including at least a part of a body of the occupant or a second image not including the body of the occupant; and a processing step of monitoring a state change of the face of the occupant based on the captured image, and switching whether or not an occupant parameter set for monitoring the state change of the face of the occupant is to be reset according to a determination result in the determination step.

According to the occupant monitoring method, it is possible to appropriately execute switching of whether or not an occupant parameter is to be reset according to whether a captured image corresponds to the first image or the second image, that is, whether or not a probability that replacement of an occupant may occur is high.

An occupant monitoring program as still another example of this disclosure causes a computer to execute an acquisition step of acquiring a captured image obtained by imaging a region in which there is a probability that a face of an occupant is present in a vehicle; a determination step of determining whether the captured image acquired in the acquisition step corresponds to at least a first image not including a feature portion of the face of the occupant but including at least a part of a body of the occupant or a second image not including the body of the occupant; and a processing step of monitoring a state change of the face of the occupant based on the captured image, and switching whether or not an occupant parameter set for monitoring the state change of the face of the occupant is to be reset according to a determination result in the determination step.

According to the occupant monitoring program, it is possible to appropriately execute switching of whether or not an occupant parameter is to be reset according to whether a captured image corresponds to the first image or the second image, that is, whether or not a probability that replacement of an occupant may occur is high.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of this disclosure will be described with reference to the drawings. Configurations of the embodiment described below and operations and results (effects) resulting from the configurations are only examples, and are not limited to the contents described below.

Figure 1:
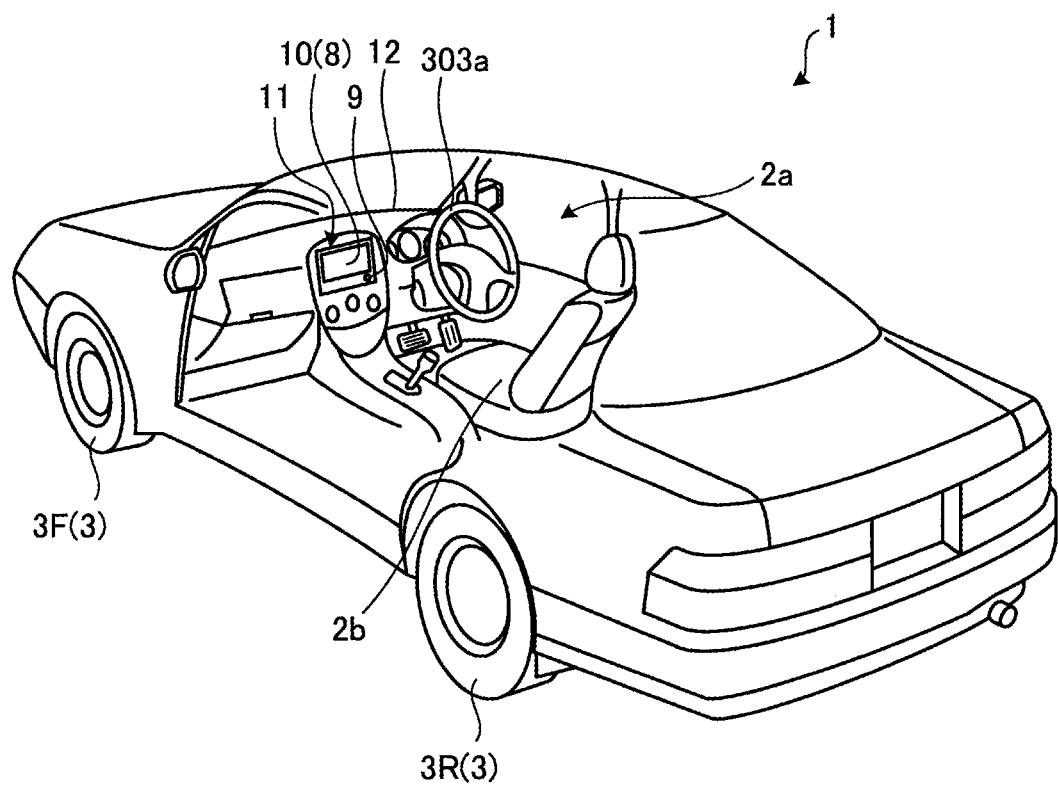
FIG. 1 is an exemplary and schematic diagram illustrating an example of a configuration of a vehicle according to an embodiment.
Figure 2:
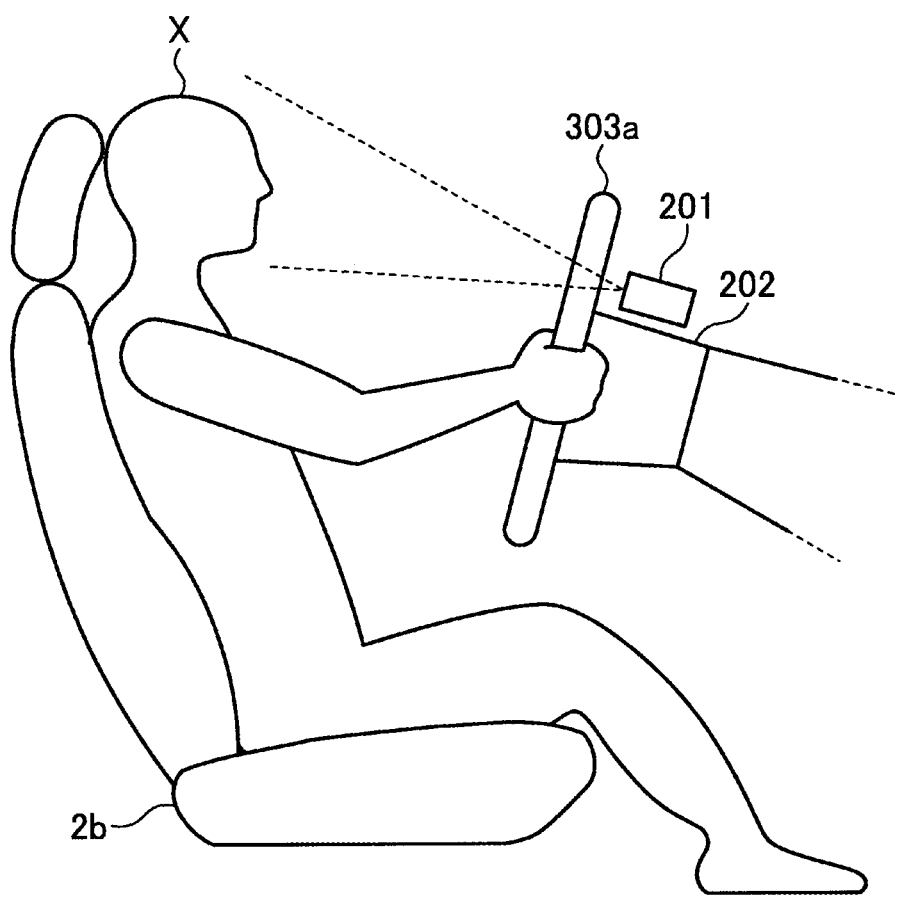
FIG. 2 is an exemplary and schematic diagram illustrating an example of disposition of an imaging device according to the embodiment.

First, with reference to FIGS. 1 and 2, a description will be made of a schematic configuration of a vehicle 1 according to an embodiment. FIG. 1 is an exemplary and schematic diagram illustrating an example of a configuration of the vehicle 1 according to the embodiment, and FIG. 2 is an exemplary and schematic diagram illustrating an example of disposition of an imaging device 201 according to the embodiment.

As illustrated in FIG. 1, the vehicle 1 according to the embodiment is a four-wheeled automobile having two left and right front wheels 3F and two left and right rear wheels 3R. Hereinafter, for simplification, the front wheels 3F and the rear wheels 3R will be referred to as vehicle wheels 3 in some cases. In the embodiment, sideslip angles of some or all of the four vehicle wheels 3 are changed (turned) in response to steering of a steering unit 303a.

As illustrated in FIG. 1, the vehicle 1 according to the embodiment has a vehicle cabin 2a in which an occupant (not illustrated in FIG. 1) rides. The steering unit 303a is provided in a state of being able to be operated by a driver X (not illustrated in FIG. 1) as an occupant on a driver's seat 2b in the vehicle cabin 2a. The steering unit 303a is configured with a steering wheel or a handle provided to protrude from a dashboard (instrument panel) 12. In the embodiment, needless to say, seats other than the driver's seat 2b may be present in the vehicle cabin 2a.

A monitor device 11 including a display unit 8 that outputs various images and a sound output unit 9 that outputs various sounds is provided in the vehicle cabin 2a. The monitor device 11 is provided, for example, at a central portion of the dashboard in a vehicle width direction (leftward-rightward direction) in the vehicle cabin 2a. In the example illustrated in FIG. 1, the display unit 8 is covered with an operation input unit 10 that detects a coordinate of a position to which an indicator such as a finger or a stylus comes close (including contact). Consequently, the occupant can visually recognize an image displayed on the display unit 8, and can input various operations by performing an input operation (for example, a touch operation) using an indicator on the operation input unit 10.

As illustrated in FIG. 2, the imaging device 201 is provided on a support portion 202 supporting the steering unit 303a. The imaging device 201 is configured with, for example, a charge coupled device (CCD) camera.

Here, in the embodiment, the imaging device 201 is configured to image a region in which there is a probability that the face of the driver X sitting on the driver's seat 2b may be present. More specifically, a viewing angle and a pose of the imaging device 201 are adjusted such that the face of the driver X sitting on the driver's seat 2b is located at the center of a visual field.

The imaging device 201 periodically executes imaging of the face of the driver X at a predetermined time interval during driving of the vehicle 1, and sequentially outputs captured images (image data corresponding thereto) obtained through the imaging to an occupant monitoring device 310 (refer to FIGS. 3 and 4) which will be described later. As will be described later in detail, the occupant monitoring device 310 executes an occupant monitoring process including detection of face information regarding the face of the driver X (and tracking of the detected face information) based on a captured image obtained through imaging in the imaging device 201, and thus monitors a state change of the face of the driver X.

Although not illustrated in FIG. 2, in the embodiment, an illumination unit that irradiates a region imaged by the imaging device 201 with light may be provided. In this case, when an infrared lamp applying infrared light is used, it is possible to assist the imaging device 201 in imaging without the driver X feeling glaring.

Hereinafter, a description will be made of an occupant monitoring process executed based on a captured image obtained by imaging device 201 and including information regarding a region in which there is a probability that the face of the driver X sitting on the driver's seat 2b may be present, but the occupant monitoring process may be executed on an occupant other than the driver X. In other words, the occupant monitoring process may be similarly executed based on a captured image obtained by an imaging unit, installed at a position that is different from the position of the imaging device 201, imaging a region in which there is a probability that a face of an occupant sitting on a seat other than the driver's seat 2b may be present.

Next, with reference to FIG. 3, a description will be made of a configuration of an occupant monitoring system 300 including the occupant monitoring device 310 executing the occupant monitoring process. The system configuration illustrated in FIG. 3 is only an example, and is variously settable (changeable).

Figure 3:
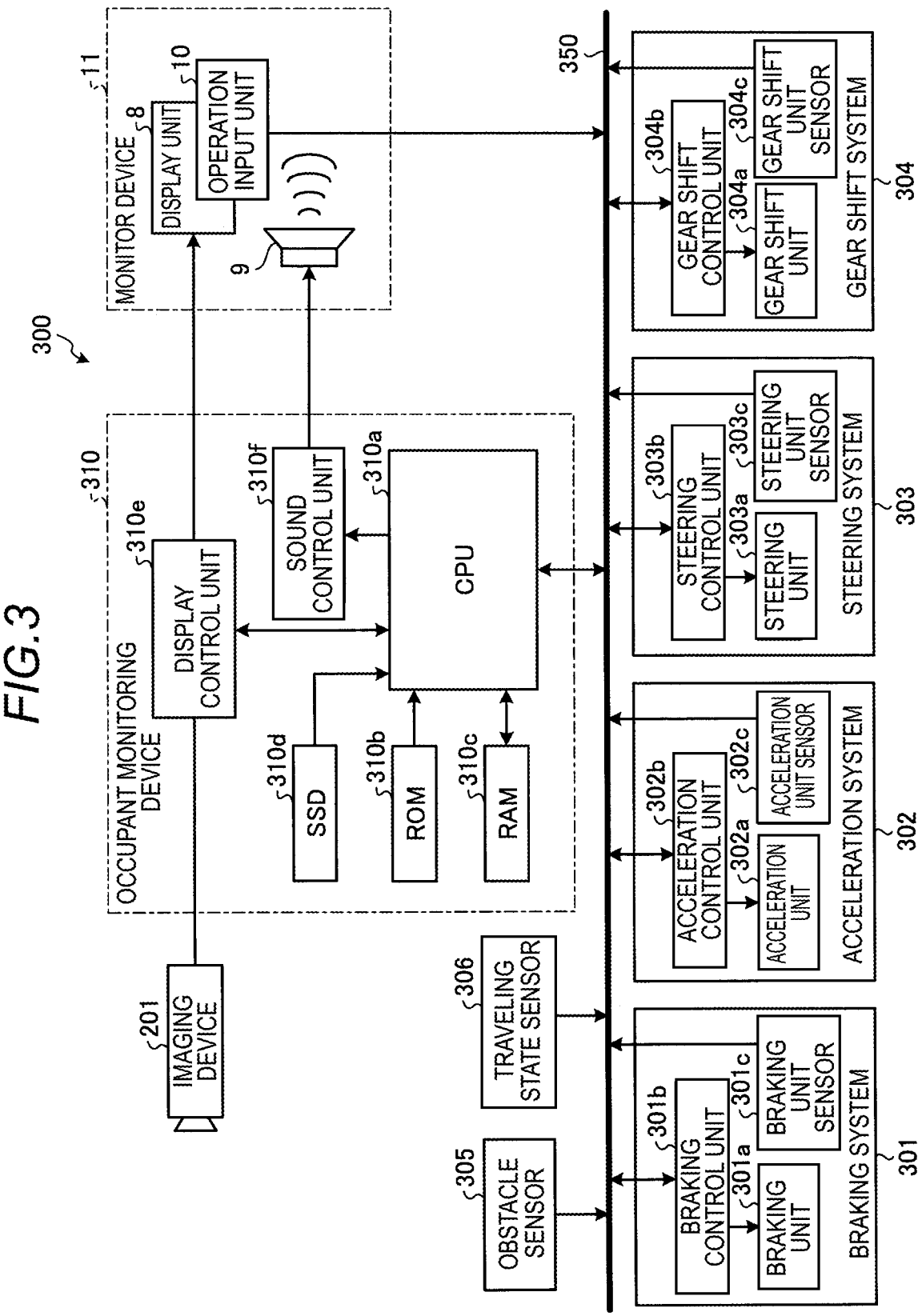
FIG. 3 is an exemplary and schematic block diagram illustrating a configuration of an occupant monitoring system according to the embodiment.

FIG. 3 is an exemplary and schematic block diagram illustrating a configuration of the occupant monitoring system 300 according to the embodiment. As illustrated in FIG. 3, the occupant monitoring system 300 includes a braking system 301, an acceleration system 302, a steering system 303, a gear shift system 304, an obstacle sensor 305, a traveling state sensor 306, the imaging device 201, the monitor device 11, the occupant monitoring device 310, and an on-vehicle network 350.

The braking system 301 controls deceleration of the vehicle 1. The braking system 301 includes a braking unit 301a, a braking control unit 301b, and a braking unit sensor 301c.

The braking unit 301a is a device used to decelerate the vehicle 1, such as a brake pedal.

The braking control unit 301b is an electronic control unit (ECU) configured with a computer having a hardware processor such as a CPU. The braking control unit 301b drives an actuator (not illustrated) based on an instruction that is input via, for example, the on-vehicle network 350, and operates the braking unit 301a to control the degree of deceleration of the vehicle 1.

The braking unit sensor 301c is a device used to detect a state of the braking unit 301a. For example, in a case where the braking unit 301a is configured with a brake pedal, the braking unit sensor 301c detects a position of the brake pedal or pressure applied to the brake pedal as a state of the braking unit 301a. The braking unit sensor 301c outputs the detected state of the braking unit 301a to the on-vehicle network 350.

The acceleration system 302 controls acceleration of the vehicle 1. The acceleration system 302 includes an acceleration unit 302a, an acceleration control unit 302b, and an acceleration unit sensor 302c.

The acceleration unit 302a is a device used to accelerate the vehicle 1, such as an accelerator pedal.

The acceleration control unit 302b is an ECU configured with a computer having a hardware processor such as a CPU. The acceleration control unit 302b drives an actuator (not illustrated) based on an instruction that is input via, for example, the on-vehicle network 350, and operates the acceleration unit 302a to control the degree of acceleration of the vehicle 1.

The acceleration unit sensor 302c is a device used to detect a state of the acceleration unit 302a. For example, in a case where the acceleration unit 302a is configured with an accelerator pedal, the acceleration unit sensor 302c detects a position of the accelerator pedal or pressure applied to the accelerator pedal. The acceleration unit sensor 302c outputs the detected state of the acceleration unit 302a to the on-vehicle network 350.

The steering system 303 controls an advancing direction of the vehicle 1. The steering system 303 includes the steering unit 303a, a steering control unit 303b, and a steering unit sensor 303c.

The steering unit 303a is a device used to turn a turning wheel of the vehicle 1, such as a steering wheel or a handle.

The steering control unit 303b is an ECU configured with a computer having a hardware processor such as a CPU. The steering control unit 303b drives an actuator (not illustrated) based on an instruction that is input via, for example, the on-vehicle network 350, and operates the steering unit 303a to control an advancing direction of the vehicle 1.

The steering unit sensor 303c is a device used to detect a state of the steering unit 303a. For example, in a case where the steering unit 303a is configured with a steering wheel, the steering unit sensor 303c detects a position of the steering wheel or a rotation angle of the steering wheel. In a case where the steering unit 303a is configured with a handle, the steering unit sensor 303c may detect a position of the handle or pressure applied to the handle. The steering unit sensor 303c outputs the detected state of the steering unit 303a to the on-vehicle network 350.

The gear shift system 304 controls a gear ratio of the vehicle 1. The gear shift system 304 includes a gear shift unit 304a, a gear shift control unit 304b, and a gear shift unit sensor 304c.

The gear shift unit 304a is a device used to change a gear ratio of the vehicle 1, such as a shift lever.

The gear shift control unit 304b is an ECU configured with a computer having a hardware processor such as a CPU. The gear shift control unit 304b drives an actuator (not illustrated) based on an instruction that is input via, for example, the on-vehicle network 350, and operates the gear shift unit 304a to control a gear ratio of the vehicle 1.

The gear shift unit sensor 304c is a device used to detect a state of the gear shift unit 304a. For example, in a case where the gear shift unit 304a is configured with a shift lever, the gear shift unit sensor 304c detects a position of the shift lever or pressure applied to the shift lever. The gear shift unit sensor 304c outputs the detected state of the gear shift unit 304a to the on-vehicle network 350.

The obstacle sensor 305 is a device used to detect information regarding an obstacle that may be present on the periphery of the vehicle 1. The obstacle sensor 305 includes a ranging sensor such as a sonar detecting a distance to an obstacle. The obstacle sensor 305 outputs the detected information to the on-vehicle network 350.

The traveling state sensor 306 is a device used to detect a traveling state of the vehicle 1. The traveling state sensor 306 includes, for example, a vehicle wheel sensor detecting a wheel speed of the vehicle 1, an acceleration sensor detecting acceleration of the vehicle 1 in a front-rear direction or a leftward-rightward direction, or a gyro sensor detecting a turning speed (angular velocity) of the vehicle 1. The traveling state sensor 306 outputs the detected traveling state to the on-vehicle network 350.

The occupant monitoring device 310 is a device integrally controlling the occupant monitoring system 300. The occupant monitoring device 310 executes an occupant monitoring process including detection of face information regarding the face of the driver X (and tracking of the detected face information) based on a captured image obtained by the imaging device 201, and thus monitors a state change of the face of the driver X. The face information is data including eye information regarding the eyes of the driver X, mouth information regarding the mouth of the driver X, and expression information regarding an expression of the driver X. The eye information is data indicating an opening or closing state of the eyes (eyelids) or a direction of a visual line, and the mouth information is data indicating an opening or closing state (conversation state) of the mouth.

The occupant monitoring device 310 is configured with an ECU including a central processing unit (CPU) 310a, a read only memory (ROM) 310b, a random access memory (RAM) 310c, a solid state drive (SSD) 310d, a display control unit 310e, and a sound control unit 310f.

The CPU 310a is a hardware processor integrally controlling the occupant monitoring device 310. The CPU 310a reads various control programs (computer programs) stored in the ROM 310b or the like, and realizes various functions according to instructions defined in the various control programs. The various control programs include an occupant monitoring program for realizing an occupant monitoring process.

The ROM 310b is a nonvolatile main storage device storing parameters or the like required to execute the various control programs.

The RAM 310c is a volatile main storage device providing a work area of the CPU 310a.

The SSD 310d is a rewritable nonvolatile auxiliary storage device. In the occupant monitoring device 310 according to the embodiment, as an auxiliary storage device, a hard disk drive (HDD) may be provided instead of the SSD 310d (or in addition to the SSD 310d).

Among various processes executed by the occupant monitoring device 310, the display control unit 310e mainly executes image processing on a captured image obtained from the imaging device 201 or generates image data to be output to the display unit 8 of the monitor device 11.

Among various processes executed by the occupant monitoring device 310, the sound control unit 310f mainly generates sound data to be output to the sound output unit 9 of the monitor device 11.

The on-vehicle network 350 communicably connects the braking system 301, the acceleration system 302, the steering system 303, the gear shift system 304, the obstacle sensor 305, the traveling state sensor 306, the operation input unit 10 of the monitor device 11, and the occupant monitoring device 310 to each other.

Meanwhile, in the related art, the occupant monitoring process is executed based on an occupant parameter that is adjusted as appropriate according to a detection result of a face of an occupant reflected in a captured image. Examples of the occupant parameter may include a position (a coordinate in a predetermined coordinate system) of the center of an eyeball of the occupant in a three-dimensional model representing a structure including a three-dimensional shape of the face of the occupant, and positions (coordinates in a predetermined coordinate system) of a plurality of points for specifying the three-dimensional model.

In the related art, for example, in a case where an occupant is replaced, it is useful to reset the occupant parameter and readjust the occupant parameter from an initial value to cope with an occupant after replacement. Therefore, a timing of resetting the occupant parameter may be a timing at which a situation occurs in which, for example, a feature portion (the eyes, the nose, or the mouth) of the occupant's face is not detected from a captured image.

However, the situation in which a feature portion of the occupant's face is not detected from a captured image may occur not only in a case where the occupant is not present in the vehicle 1 during replacement but also in a case where the occupant is present in the vehicle 1 but is present at a position where a feature portion of the face is not reflected in the captured image. In the latter case, since an occupant is not replaced, when the occupant parameter is reset, for example, a wasteful process for readjusting the occupant parameter may be necessary, or the accuracy of an occupant monitoring process may be reduced.

Figure 4:
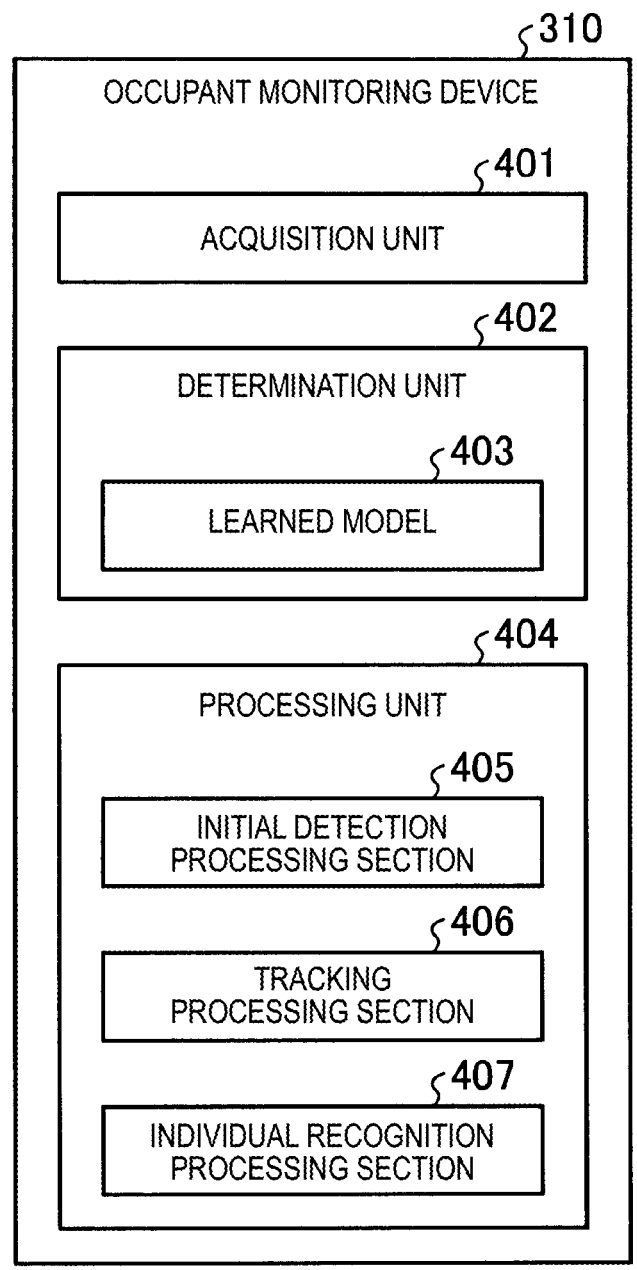
FIG. 4 is an exemplary and schematic block diagram illustrating functions of an occupant monitoring device according to the embodiment.

Therefore, in the embodiment, the occupant monitoring device 310 has functions as illustrated in FIG. 4, and thus switching of whether or not an occupant parameter is to be reset is appropriately executed.

FIG. 4 is an exemplary and schematic block diagram illustrating functions of the occupant monitoring device 310 according to the embodiment. The functions illustrated in FIG. 4 are realized through cooperation between software and hardware. In other words, in the example illustrated in FIG. 4, the functions of the occupant monitoring device 310 are realized as a result of the CPU 310a reading and executing a predetermined control program stored in the ROM 310b. In the embodiment, at least some of the functions illustrated in FIG. 4 may be realized by dedicated hardware (circuit).

As illustrated in FIG. 4, the occupant monitoring device 310 according to the embodiment includes an acquisition unit 401, a determination unit 402, and a processing unit 404.

The acquisition unit 401 successively acquires captured images obtained by the imaging device 201 a plurality of times at predetermined control timings. As described above, the captured image includes information regarding a region in which there is a probability that the face of the driver X may be present in the vehicle 1.

The determination unit 402 determines whether a captured image acquired by the acquisition unit 401 corresponds to a first image that does not include a feature portion (the eyes, the nose, or the mouth) of the face but includes at least a part of the body, a second image that includes neither a feature portion of the face nor the body, or a third image that includes a feature portion of the face.

More specifically, the determination unit 402 has a learned model 403 generated as a result of machine learning, and determines whether the captured image corresponds to any one of the first image, the second image, or the third image based on the learned model 403. The learned model 403 may be generated through, for example, supervised learning in which labels respectively corresponding to the first image, the second image, and the third image are added to a plurality of learning images, and combinations of the learning images and the labels are used as training data. The learning image is assumed to be an image captured under the same condition as, for example, that of a captured image, and to include the same information as that of the captured image. In the embodiment, machine learning for generating the learned model 403 is not limited to supervised learning, and may be unsupervised learning, reinforcement learning, or a combination of one or more of the three learning schemes.

Here, a description will be briefly made of specific examples of the first image, the second image, and the third image.

Figure 5:
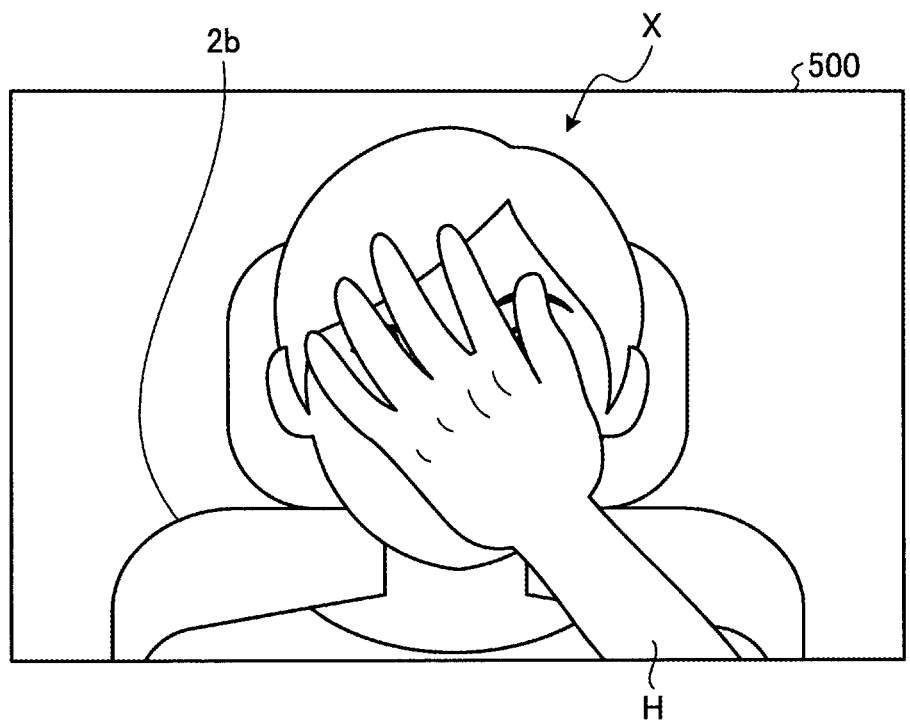
FIG. 5 is an exemplary and schematic diagram illustrating an example of a first image according to the embodiment.

FIG. 5 is an exemplary and schematic diagram illustrating an example of the first image according to the embodiment. An image 500 illustrated in FIG. 5 does not includes a feature portion of the face of the driver X but includes at least a part of the body, and is thus an example of the first image. More specifically, the image 500 represents a situation in which the driver X is sitting on the driver's seat 2b, a part of the body including the hand H of the driver X is reflected, but a feature portion of the face is hidden by the hand H and thus is not reflected.

Since face information regarding the face of the driver X cannot be detected from the first image such as the image 500 illustrated in FIG. 5, the image 500 cannot be used for an occupant monitoring process including detection of face information (and tracking of the detected face information), but it can be detected that the driver X is present in the vehicle. Hereinafter, the first image will be referred to as a hiding image in some cases for convenience.

Figure 6:
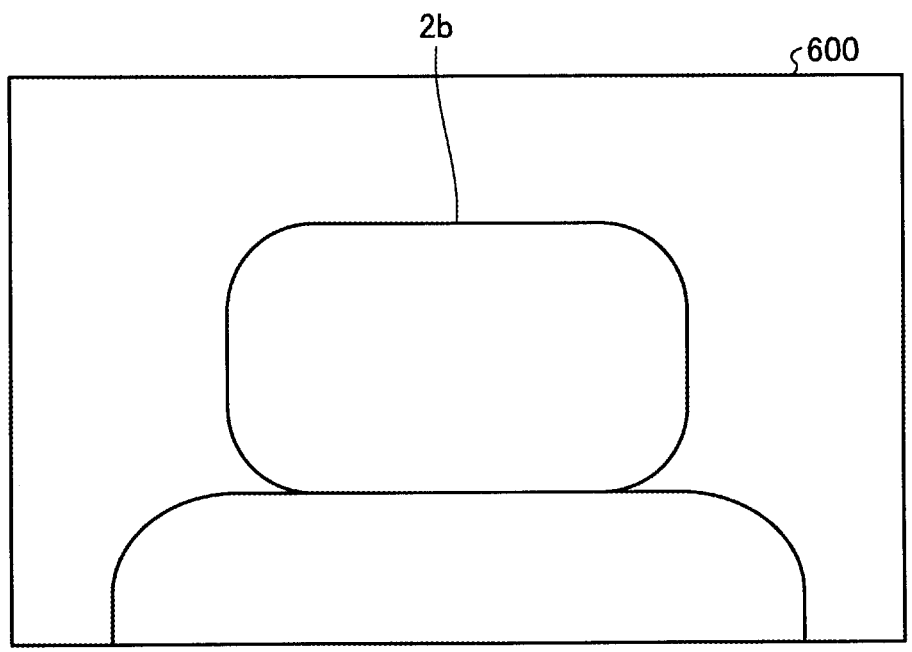
FIG. 6 is an exemplary and schematic diagram illustrating an example of a second image according to the embodiment.

FIG. 6 is an exemplary and schematic diagram illustrating an example of a second image according to the embodiment. An image 600 illustrated in FIG. 6 includes neither the face of the driver X nor a part of the body, and is thus an example of the second image. More specifically, the image 600 represents a situation in which the driver X is not completely reflected, and only the driver's seat 2b is reflected.

Since face information regarding the face of the driver X cannot be detected from the second image such as the image 600 illustrated in FIG. 6, the image 600 cannot be used for an occupant monitoring process including detection of face information (and tracking of the detected face information). In other words, since neither face information of the driver X nor the presence of the driver X in the vehicle is detected from the second image, it can be said that the second image represents a situation in which the driver X is not present in the vehicle for replacement or the like. Hereinafter, the second image will be referred to as an absence image in some cases for convenience.

Figure 7:
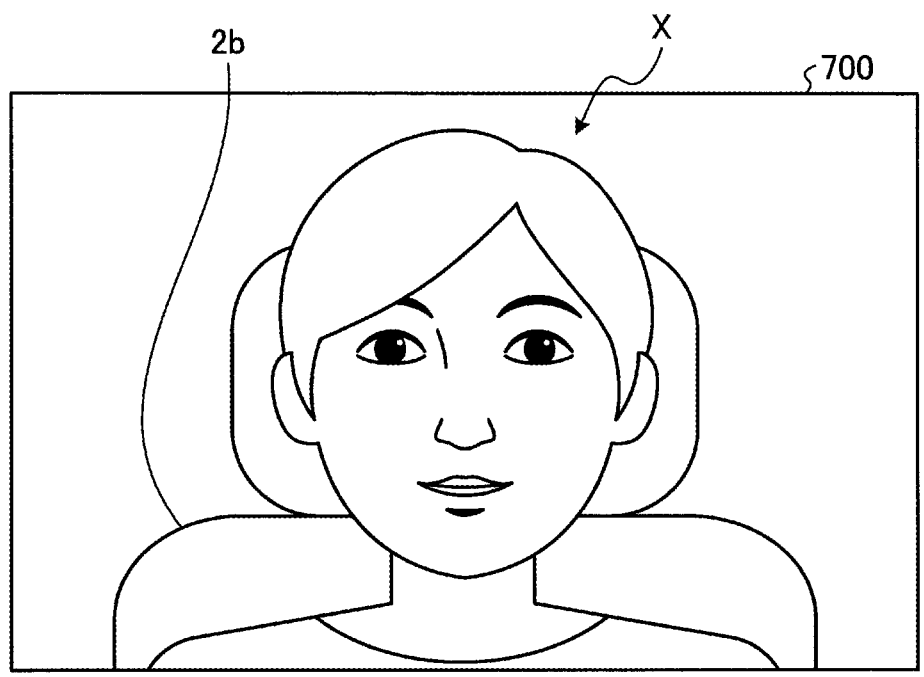
FIG. 7 is an exemplary and schematic diagram illustrating an example of a third image according to the embodiment.

FIG. 7 is an exemplary and schematic diagram illustrating an example of a third image according to the embodiment. An image 700 illustrated in FIG. 7 includes a feature portion of the face of the driver X, and is thus an example of the third image. More specifically, the image 700 represents a situation in which the whole face of the driver X is exposed.

Face information of the driver X can be detected from the third image such as the image 700 illustrated in FIG. 7. Therefore, the third image can be used for an occupant monitoring process including detection of face information (and tracking of the detected face information). Hereinafter, the third image will be referred to as a detection possible image in some cases for convenience.

Hereinafter, in a case where a captured image acquired by the acquisition unit 401 corresponds to an absence image, it is determined that there is a high probability that the driver X may be replaced, and thus it is proper to reset an occupant parameter.

On the other hand, in a case where a captured image acquired by the acquisition unit 401 corresponds to a hiding image, face information cannot be detected, but the driver X is not replaced, and, subsequently, face information of an identical person can be determined as being successively detected, and thus it is proper to hold without resetting an occupant parameter.

In a case where a captured image acquired by the acquisition unit 401 corresponds to a detection possible image, the latest face information can be detected from the detection possible image, and thus it is proper to update an occupant parameter based on the latest face information.

As mentioned above, there is a difference in a proper method of handling an occupant parameter according to whether a captured image acquired by the acquisition unit 401 corresponds to an absence image, a hiding image, or a detection possible image.

Therefore, referring to FIG. 4, the processing unit 404 switches whether or not an occupant parameter set for monitoring a state change of the face of the driver X is to be reset according to a determination result in the determination unit. Hereinafter, functions of the processing unit 404 will be described in more detail.

The processing unit 404 has functional modules respectively corresponding to two control modes such as an initial detection mode of detecting face information from a captured image for the first time as an initial step of the occupant monitoring process and a tracking mode of tracking the face information detected in the initial detection process.

In other words, the processing unit 404 includes an initial detection processing section 405 executing an initial detection process as a process corresponding to the initial detection mode, and a tracking processing section 406 executing a tracking process as a process corresponding to the tracking mode.

A control mode of the processing unit 404 is set to the initial detection mode, for example, in a case where the acquisition unit 401 acquires a captured image.

As described above, in a case where a captured image corresponds to a detection possible image, face information of the driver X can be detected. Therefore, in the embodiment, in a case where a captured image corresponds to a detection possible image, the initial detection processing section 405 of the processing unit 404 detects face information and also updates an occupant parameter based on the captured image and the current occupant parameter.

More specifically, in the embodiment, in a case where a captured image corresponds to a detection possible image, the initial detection processing section 405 of the processing unit 404 appropriately adjusts an occupant parameter representing a three-dimensional model acquired as data representing a structure including a three-dimensional shape of the face, to match feature points of the detection possible image, and thus detects face information and also updates the occupant parameter.

In a case where the face information is normally detected by the initial detection processing section 405, a control mode of the processing unit 404 is set to the tracking mode.

The tracking processing section 406 of the processing unit 404 executes tracking of the face information detected in the initial detection process based on a captured image acquired next and the updated occupant parameter.

On the other hand, as described above, in a case where a captured image corresponds to a hiding image or an absence image, face information of the driver X cannot be detected. Therefore, in the embodiment, in a case where a captured image corresponds to a hiding image or an absence image, the initial detection processing section 405 of the processing unit 404 does not detect face information, and does not update an occupant parameter.

More specifically, in the embodiment, the initial detection processing section 405 of the processing unit 404 holds an occupant parameter without detecting face information in a case where a captured image corresponds to a hiding image, and resets the occupant parameter without detecting face information in a case where the captured image corresponds to an absence image.

As mentioned above, in a case where a captured image corresponds to a hiding image or an absence image, face information that is a tracking target is not detected in the initial detection process. Therefore, in this case, the processing unit 404 causes the initial detection processing section 405 to execute the initial detection process again without causing the tracking processing section 406 to execute tracking of face information after the initial detection processing section 405 executes the initial detection process. In other words, in this case, the processing unit 404 switches whether or not face information is to be detected and switches whether an occupant parameter is to be held, reset, or updated, according to a determination result in the determination unit 402 with respect to a captured image acquired next.

As described above, captured images are successively acquired by the acquisition unit 401 a plurality of times. In this configuration, a timing at which a captured image changes from an absence image to a detection possible image corresponds to an initial timing at which the driver X is replaced, and thus a new driver X can be determined as being clearly identifiable based on the captured image. In a case where an individual recognition process is executed at this timing, it is possible to appropriately provide a service set in advance (customized) for each driver X, such as setting of an audio or air conditioning, or adjustment of a position of the driver's seat 2b, to the identified new driver X.

Therefore, in the embodiment, the processing unit 404 includes an individual recognition processing section 407 executing the individual recognition process. In a case where a captured image is determined as corresponding to an absence image by the determination unit 402, and then the captured image is determined as corresponding to a detection possible image by the determination unit 402 for the first time, the individual recognition processing section 407 identifies the driver X based on the captured image, and executes, as the individual recognition process, a process of executing a service set in advance according to an identification result. Identification of the driver X is executed based on identification information of an individual acquired from the captured image through, for example, an image recognition process.

Hereinafter, the initial detection process, the individual recognition process, and tracking process according to the embodiment will be described in detail with reference to flowcharts.

First, the initial detection process will be described in detail.

Figure 8:
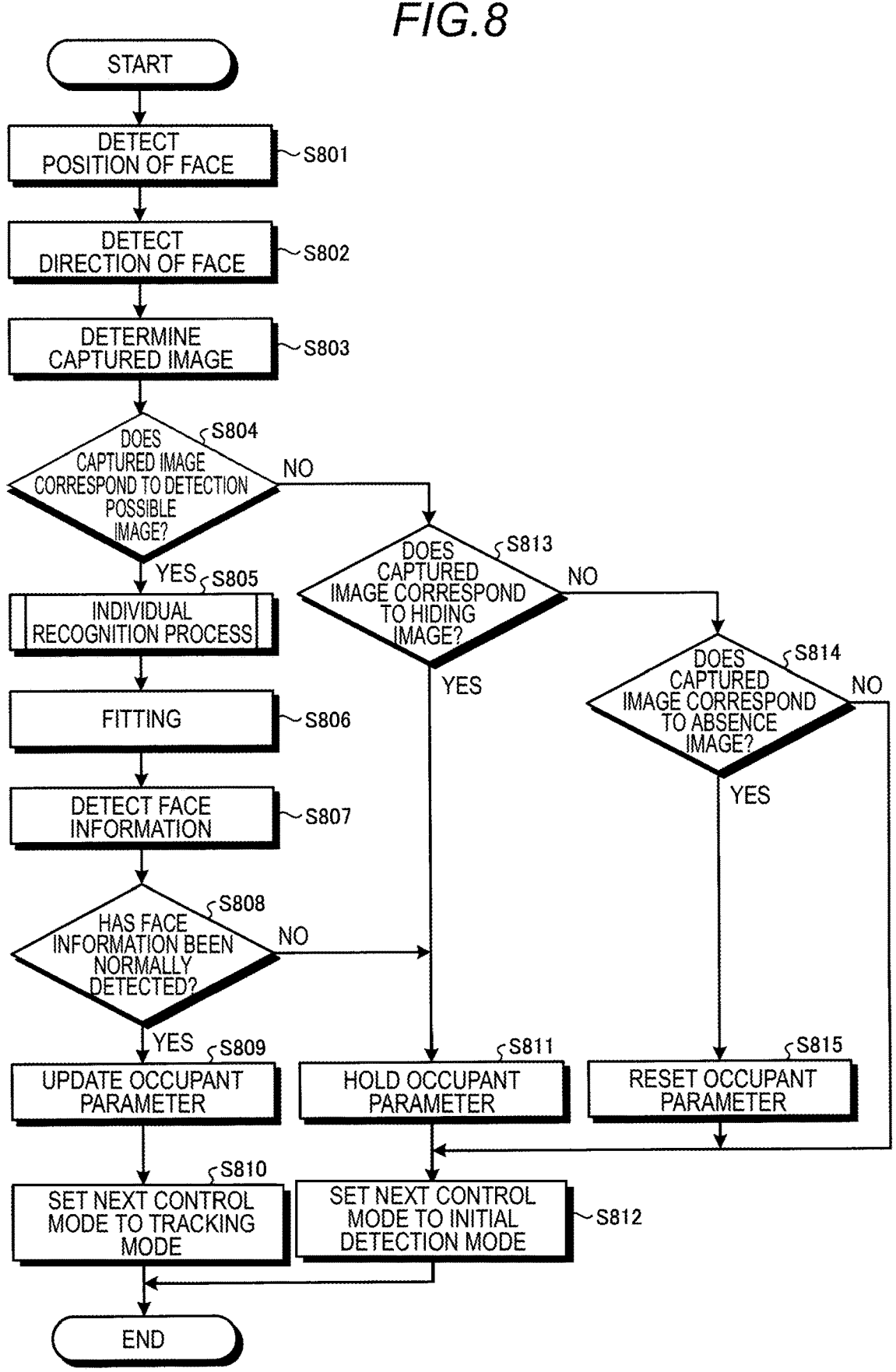
FIG. 8 is an exemplary and schematic flowchart illustrating an initial detection process executed by the occupant monitoring device according to the embodiment.

FIG. 8 is an exemplary and schematic flowchart illustrating an initial detection process executed by the occupant monitoring device 310 according to the embodiment. The initial detection process is executed, for example, in a case where a control mode of the processing unit 404 is set to the initial detection mode, and a captured image is acquired by the acquisition unit 401.

As illustrated in FIG. 8, in the initial detection process, first, in S801, the initial detection processing section 405 detects a position of a face in the captured image.

In S802, the initial detection processing section 405 detects a direction of the face in the captured image.

In S803, the determination unit 402 determines the captured image.

In S804, the initial detection processing section 405 determines whether or not the captured image corresponds to a detection possible image such as the image 700 illustrated in FIG. 7 based on a determination result in S802.

In a case where it is determined that the captured image corresponds to the detection possible image in S804, the process proceeds to S805. In S805, the individual recognition processing section 407 executes an individual recognition process as illustrated in FIG. 9.

Figure 9:
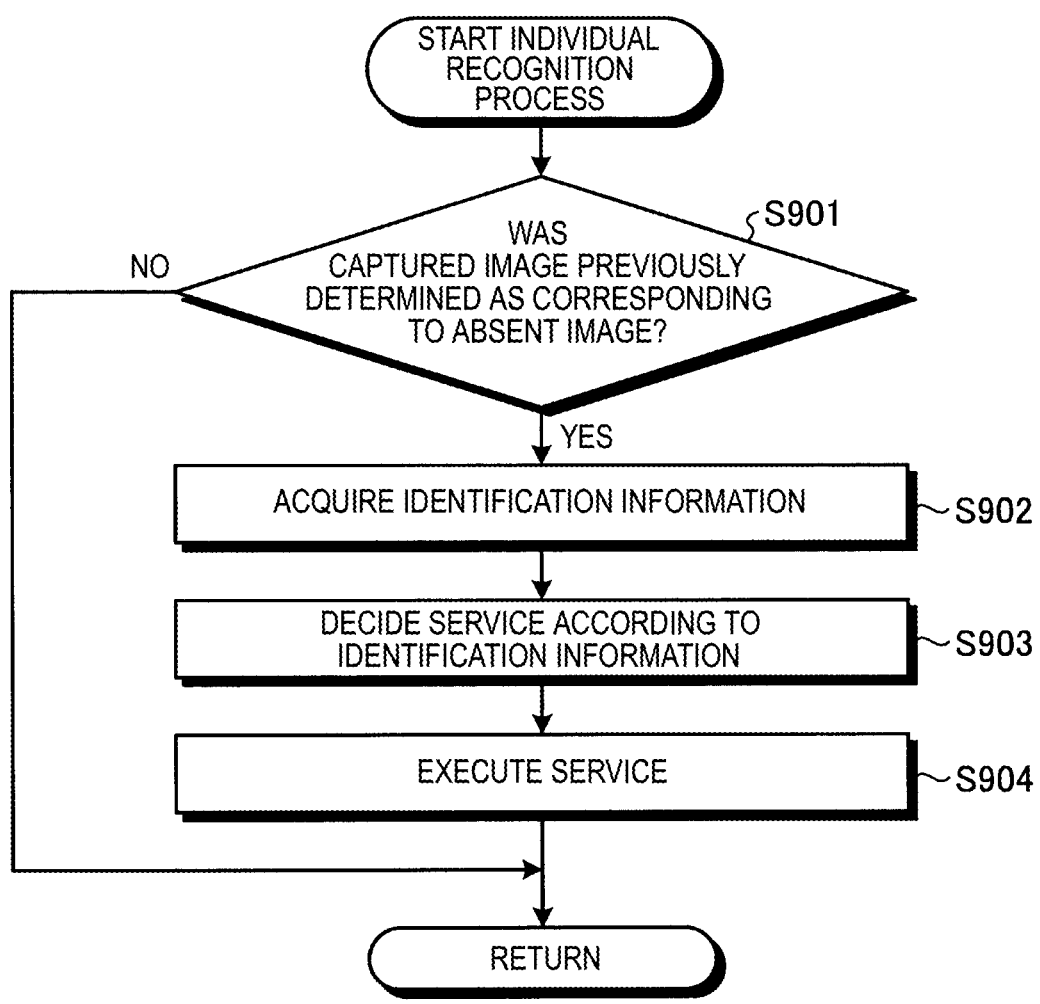
FIG. 9 is an exemplary and schematic flowchart illustrating an individual recognition process executed by the occupant monitoring device according to the embodiment.

FIG. 9 is an exemplary and schematic flowchart illustrating an individual recognition process executed by the occupant monitoring device 310 according to the embodiment. As described above, the individual recognition process is a process of executing a service set in advance for each driver X according to replacement of the driver X.

As illustrated in FIG. 9, in the individual recognition process, first, in S901, the individual recognition processing section 407 determines whether or not a captured image was determined as corresponding to an absence image in the previous determination process (refer to S803 illustrated in FIG. 8) executed by the determination unit 402.

In a case where it is determined that the captured image was determined as not corresponding to an absence image in the previous determination process in S901, it may be determined that the driver X is not replaced. Therefore, in this case, the process is finished without executing identification of the driver X, and the process in S805 illustrated in FIG. 8 is finished.

On the other hand, in a case where it is determined that the captured image was determined as corresponding to an absence image in the previous determination process in S901, the current timing may be determined as being an initial timing at which the driver X is replaced, and the new driver X can be clearly identified based on the captured image. Therefore, in this case, the process proceeds to S902, and, in S902, the individual recognition processing section 407 executes an image recognition process or the like on the captured image in order to specify the new driver X, and acquires identification information for identifying an individual from the captured image.

In S903, the individual recognition processing section 407 decides a service set in advance for the driver X after replacement according to the identification information acquired in S902. For example, it is assumed that pieces of identification information of a plurality of drivers X and services set in advance (customized) for the plurality of respective drivers X are stored in the occupant monitoring device 310 in a state of being correlated with each other.

In S904, the individual recognition processing section 407 executes the service decided in S903. Consequently, a service such as setting of an audio or air conditioning, or adjustment of a position of the driver's seat 2b can be provided at a proper content corresponding to the driver X after replacement.

In a case where the process in S904 is finished, the process in S805 illustrated in FIG. 8 is finished.

Referring to FIG. 8 again, in S806, the initial detection processing section 405 executes fitting between the captured image and a three-dimensional model acquired as data representing a structure including a three-dimensional shape of the face while adjusting the currently held occupant parameter, and detects the position and the direction of the face included in the captured image in more detail. The fitting in the initial detection process is executed based on, for example, an initial model set in advance as statistical data representing a structure including a three-dimensional shape of a face.

In S807, the initial detection processing section 405 detects face information regarding the face of the driver X based on a result of the fitting in S806. As described above, the face information is data including eye information (opening or closing state of eyelids or a direction of a visual line) regarding the eyes of the driver X, mouth information (conversation state) regarding the mouth of the driver X, and expression information regarding an expression of the driver X.

In S808, the initial detection processing section 405 determines whether or not the face information has been normally detected. For example, the initial detection processing section 405 calculates a value (score) indicating reliability of each of the processes in S805 to S807 as a series of processes recently executed in order to detect the face information, and executes the determination in S808 based on the score.

In a case where it is determined that the face information has been normally detected in S808, the process proceeds to S809. In S809, the initial detection processing section 405 updates the occupant parameter to reflect the result of the fitting in S806.

In S810, the initial detection processing section 405 sets the next control mode of the processing unit 404 to the tracking mode. The process is finished.

On the other hand, in a case where it is determined that the face information has not been normally detected in S808, the process proceeds to S811. In S811, the initial detection processing section 405 holds the occupant parameter without updating the occupant parameter.

In S812, the initial detection processing section 405 sets the next control mode of the processing unit 404 to the initial detection mode. The process is finished.

In a case where it is determined that the captured image does not correspond to a detection possible image in S804, the process proceeds to S813. In S813, the initial detection processing section 405 determines whether or not the captured image corresponds to a hiding image such as the image 500 illustrated in FIG. 5 based on the determination result in S803.

In a case where it is determined that the captured image corresponds to a hiding image in S813, detection of face information and update of the occupant parameter are not executed. Therefore, in this case, the process proceeds to S811. The processes in S811 and the subsequent steps have already been described, and thus a description thereof will be omitted here.

On the other hand, in a case where it is determined that the captured image does not correspond to the hiding image in S813, the process proceeds to S814. In S814, the initial detection processing section 405 determines whether or not the captured image corresponds to an absence image such as the image 600 as illustrated in FIG. 6 based on the determination result in S803.

In a case where it is determined that the captured image corresponds to a hiding image in S813, the occupant parameter is reset without detecting face information. Therefore, in this case, the process proceeds to S815, and, in S815, the initial detection processing section 405 resets the occupant parameter to an initial value.

In a case where the process in S815 is completed, the process proceeds to S812, and, in a case where it is determined that the captured image does not correspond to a hiding image in S814, the process also proceeds to S812, but the processes in S812 and the subsequent steps have already been described, and thus a description thereof will be omitted here.

Next, the tracking process will be described in detail.

Figure 10:
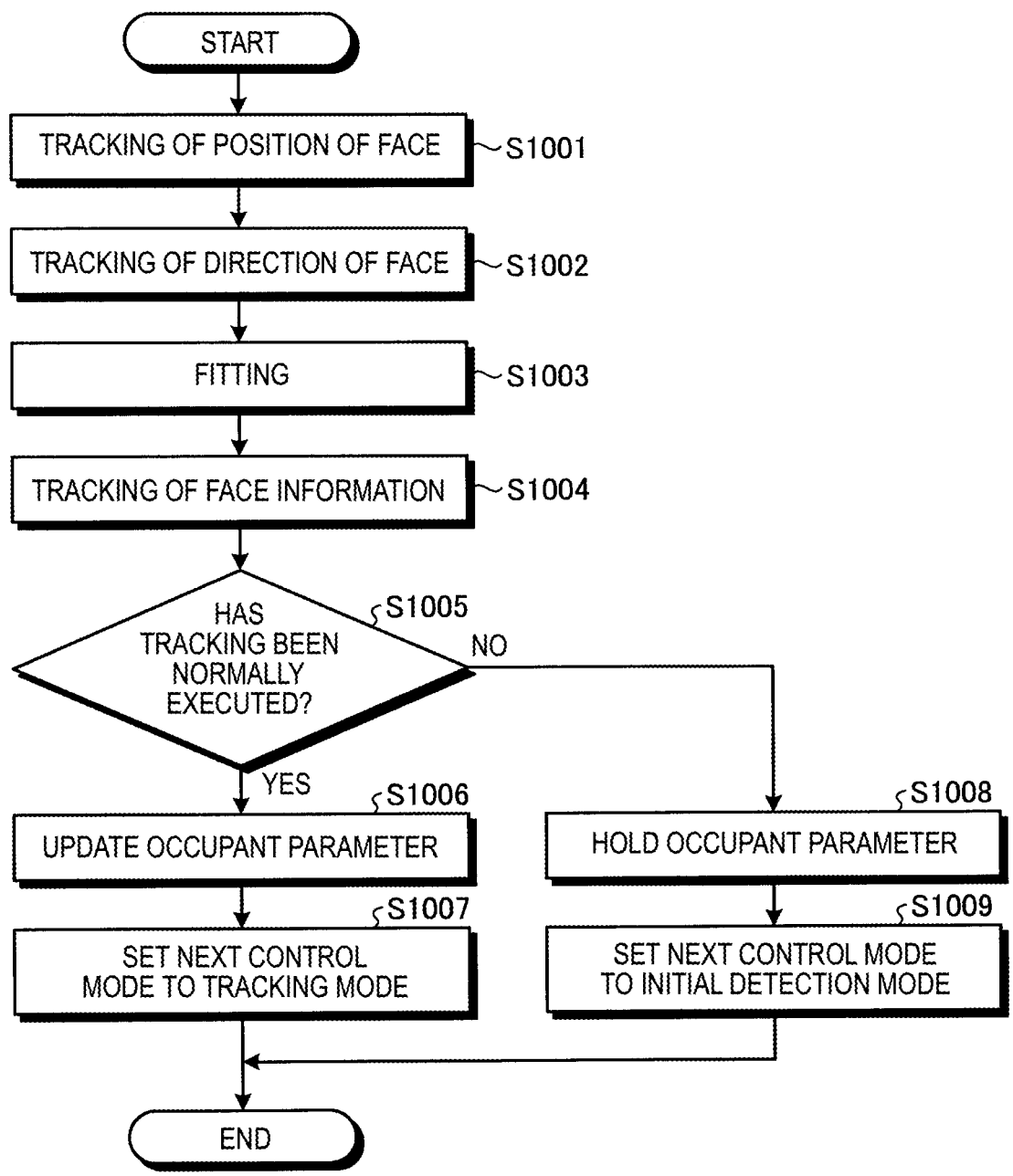
FIG. 10 is an exemplary and schematic flowchart illustrating a tracking process executed by the occupant monitoring device according to the embodiment.

FIG. 10 is an exemplary and schematic flowchart illustrating a tracking process executed by the occupant monitoring device 310 according to the embodiment. The tracking process is executed, for example, in a case where a control mode of the processing unit 404 is set to the tracking mode, and a captured image is acquired by the acquisition unit 401.

As illustrated in FIG. 10, in the tracking process, first, in S1001, the tracking processing section 406 executes tracking of a position of a face in the captured image. The tracking may be used to restrict a retrieval range, to use a template for matching, or to specify a changed portion based on a difference between consecutive frames, by using the various detection results in the initial detection process. Therefore, generally, the tracking is higher in processing speed than various detections in the initial detection process.

In S1002, the tracking processing section 406 executes tracking of a direction of the face in the captured image.

In S1003, the tracking processing section 406 executes fitting between the captured image and a three-dimensional model while adjusting the currently held occupant parameter. The fitting in the tracking process is executed, for example, based on the latest three-dimensional model after being adjusted in the previous initial detection process or tracking process.

In S1004, the tracking processing section 406 executes tracking of face information detected in the initial detection process based on a result of the fitting in S1003.

In S1005, the tracking processing section 406 determines whether or not the tracking of the face information has been normally executed. For example, the tracking processing section 406 calculates a value (score) indicating reliability of each of the processes recently executed in order to track the face information, and executes the determination in S1005 based on the score.

In a case where it is determined that the tracking of the face information has been normally executed in S1005, the process proceeds to S1006. In S1006, the tracking processing section 406 updates the occupant parameter to reflect the result of the fitting in S1003.

In S1007, the tracking processing section 406 sets the next control mode of the processing unit 404 to the tracking mode. The process is finished.

On the other hand, in a case where it is determined that the tracking of the face information has not been normally executed in S1005, the process proceeds to S1008. In S1008, the tracking processing section 406 holds the occupant parameter without updating the occupant parameter.

In S1009, the tracking processing section 406 sets the next control mode of the processing unit 404 to the initial detection mode. The process is finished.

As described above, the occupant monitoring device 310 according to the embodiment includes the acquisition unit 401, the determination unit 402, and the processing unit 404. The acquisition unit 401 acquires a captured image obtained by imaging a region in which there is a probability that the face of the driver X as an occupant may be present in the vehicle 1. The determination unit 402 determines whether the captured image acquired by the acquisition unit 401 corresponds to at least one of a hiding image such as the image 500 illustrated in FIG. 5, that is, the first image not including a feature portion of the face of the driver X but including at least a part of the body of the driver X and an absence image such as the image 600 illustrated in FIG. 6, that is, the second image not including the body of the driver X. The processing unit 404 monitors a state change of a face of an occupant based on a captured image, and switches whether or not an occupant parameter set for monitoring a state change of the face of the driver X is to be reset according to a determination result in the determination unit 402.

The occupant monitoring device 310 according to the embodiment can appropriately execute switching of whether or not the occupant parameter is to be reset according to whether a captured image corresponds to a hiding image or an absence image, that is, whether or not a probability that replacement of the driver X occurs is high.

In the occupant monitoring device 310 according to the embodiment, the determination unit 402 determines whether a captured image corresponds to any one of a hiding image, an absence image, and a detection possible image such as the image 700 illustrated in FIG. 7, that is, the third image including a face of an occupant. In a case where the determination unit 402 determines that the captured image corresponds to a hiding image, the processing unit 404 holds the occupant parameter without detecting face information regarding the face of the driver X based on the captured image. In a case where the determination unit 402 determines that the captured image corresponds to an absence image, the processing unit 404 resets the occupant parameter without detecting face information based on the captured image. In a case where the determination unit 402 determines that the captured image corresponds to a detection possible image, the processing unit 404 detects face information based on the captured image, and updates the occupant parameter. According to this configuration, it is possible to switch whether or not face information is to be detected according to whether a captured image corresponds to a hiding image, an absence image, or a detection possible image, and to switch whether an occupant parameter is to be held, reset, or updated.

In the occupant monitoring device 310 according to the embodiment, the acquisition unit 401 successively acquires captured images a plurality of times. In a case where the determination unit 402 determines that a captured image corresponds to a detection possible image, the processing unit 404 detects face information, updates the occupant parameter, and then executes tracking of the face information based on a captured image acquired next by the acquisition unit 401. In a case where the determination unit 402 determines that the captured image corresponds to a hiding image or an absence image, the processing unit 404 holds or resets the occupant parameter without detecting face information, and then switches whether or not face information is to be detected and whether the occupant parameter is to be reset or updated according to a determination result in the determination unit 402 with respect to a captured image acquired next by the acquisition unit 401 without executing tracking of the face information. According to this configuration, it is possible to appropriately switch whether or not tracking of face information is to be executed according to whether or not a captured image corresponds to a detection possible image from which tracking of face information is executable.

In the occupant monitoring device 310 according to the embodiment, in a case where the determination unit 402 determines that a captured image corresponds to an absence image, and then the determination unit 402 determines that the captured image corresponds to a detection possible image for the first time, the processing unit 404 identifies the driver X based on the captured image, and executes a service set in advance for each driver X based on an identification result. According to this configuration, in a case where there is a high probability that replacement of the driver X may occur, the driver X after replacement is identified, and thus it is possible to execute a proper service for each driver X.

In the occupant monitoring device 310 according to the embodiment, the occupant parameter includes a position of the center of the eyeball of the driver X in a three-dimensional model representing a structure including a three-dimensional shape of the face of the driver X. According to this configuration, it is possible to appropriately switch whether or not the position of the center of the eyeball of the driver X in the three-dimensional model is to be reset as the occupant parameter.

In the occupant monitoring device 310 according to the embodiment, the determination unit 402 determines whether a captured image acquired by the acquisition unit 401 corresponds to the first image or the second image based on the learned model 403 generated by learning a learning image including information similar to the captured image and whether the learning image corresponds to the first image or the second image through machine learning. According to this configuration, it is possible to easily determine a captured image based on the learned model 403.

In the embodiment, the occupant parameter is not limited to a parameter for specifying a structure including a shape of a face of an occupant, such as a position of the center of the eyeball of the driver X in a three-dimensional model. In other words, the occupant parameter may include a parameter that has no direct relation to a face of an occupant, such as a sex or age as long as the occupant parameter is a parameter set to monitor a state change of the face of the occupant.

An occupant monitoring program executed in the occupant monitoring device 310 according to the embodiment may be provided or distributed via a network such as the Internet. In other words, the occupant monitoring program executed in the occupant monitoring device 310 according to the embodiment may be provided in a form of being downloaded via a network in a state of being stored on a computer connected to the network such as the Internet.

In the occupant monitoring device, the determination unit may determine whether the captured image corresponds to the first image, the second image, or a third image including the face of the occupant, in a case where the determination unit determines that the captured image corresponds to the first image, the processing unit may hold the occupant parameter without detecting face information regarding the face of the occupant based on the captured image, in a case where the determination unit determines that the captured image corresponds to the second image, the processing unit may reset the occupant parameter without detecting the face information based on the captured image, and, in a case where the determination unit determines that the captured image corresponds to the third image, the processing unit may detect the face information based on the captured image, and updates the occupant parameter. According to this configuration, it is possible to switch whether or not face information is to be detected according to whether a captured image corresponds to the first image, the second image, or the third image, and to switch whether an occupant parameter is to be held or reset or updated.

In this case, the acquisition unit may successively acquire the captured image a plurality of times, in a case where the determination unit determines that the captured image corresponds to the third image, the processing unit may detect the face information, updates the occupant parameter, and then executes tracking of the face information based on the captured image acquired next by the acquisition unit, and, in a case where the determination unit determines that the captured image corresponds to the first image or the second image, the processing unit may hold or reset the occupant parameter without detecting the face information, and then switch whether or not the face information is to be detected and whether the occupant parameter is to be reset, held, or updated according to a determination result in the determination unit with respect to the captured image acquired next by the acquisition unit without executing tracking of the face information. According to this configuration, it is possible to appropriately switch whether or not tracking of face information is to be executed according to whether or not a captured image corresponds to the third image from which tracking of face information is executable.

In the occupant monitoring device including the determination unit that determines whether or not the captured image corresponds to any one of the first image, the second image, and the third image, the acquisition unit may successively acquire the captured image a plurality of times, and, in a case where the determination unit determines that the captured image corresponds to the second image, and then the determination unit determines that the captured image corresponds to the third image for the first time, the processing unit may identify the occupant based on the captured image, and execute a service set in advance for each occupant based on an identification result. According to this configuration, in a case where there is a high probability that replacement of an occupant may occur, an occupant after replacement is identified, and thus it is possible to execute a proper service for each occupant.

In the occupant monitoring device, the occupant parameter may include a position of the center of an eyeball of the occupant in a three-dimensional model representing a structure including a three-dimensional shape of the face of the occupant. According to this configuration, it is possible to appropriately switch whether or not a position of the center of the eyeball of an occupant in a three-dimensional model is to be reset as an occupant parameter.

In the occupant monitoring device, the determination unit may determine whether the captured image acquired by the acquisition unit corresponds to at least the first image or the second image based on a learned model generated by learning a learning image including information similar to the captured image and whether the learning image corresponds to at least the first image or the second image through machine learning. According to this configuration, it is possible to easily determine a captured image based on a learned model.

As mentioned above, the embodiment of this disclosure has been described, but the embodiment is only an example, and is not intended to limit the scope of this disclosure. The novel embodiment can be implemented in various forms, and various omissions, replacements, and changes may occur within the scope without departing from the concept of this disclosure. The embodiment and modifications thereof fall within the scope or the concept of this disclosure, and also fall within the invention disclosed in the claims and the equivalents thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant monitoring device comprising:
at least one hardware processor configured to implement:
an acquisition unit that acquires a captured image obtained by imaging a region in which there is a probability that a face of an occupant is present in a vehicle;
a determination unit that determines whether the captured image acquired by the acquisition unit corresponds to at least a first image not including a feature portion of the face of the occupant but including at least a part of a body of the occupant or a second image not including the body of the occupant; and
a processing unit that monitors a state change of the face of the occupant based on the captured image, and switches whether or not an occupant parameter set for monitoring the state change of the face of the occupant is to be reset according to a determination result in the determination unit, wherein
the determination unit determines whether the captured image corresponds to the first image, the second image, or a third image including the face of the occupant,
in a case where the determination unit determines that the captured image corresponds to the first image, the processing unit holds the occupant parameter without detecting face information regarding the face of the occupant based on the captured image,
in a case where the determination unit determines that the captured image corresponds to the second image, the processing unit resets the occupant parameter without detecting the face information based on the captured image, and
in a case where the determination unit determines that the captured image corresponds to the third image, the processing unit detects the face information based on the captured image, and updates the occupant parameter.

2. The occupant monitoring device according to claim 1, wherein
the acquisition unit successively acquires the captured image a plurality of times,
in a case where the determination unit determines that the captured image corresponds to the third image, the processing unit detects the face information, updates the occupant parameter, and then executes tracking of the face information based on the captured image acquired next by the acquisition unit, and
in a case where the determination unit determines that the captured image corresponds to the first image or the second image, the processing unit holds or resets the occupant parameter without detecting the face information, and then switches whether or not the face information is to be detected and whether the occupant parameter is to be reset, held, or updated according to a determination result in the determination unit with respect to the captured image acquired next by the acquisition unit without executing tracking of the face information.

3. The occupant monitoring device according to claim 2, wherein
the acquisition unit successively acquires the captured image a plurality of times, and
in a case where the determination unit determines that the captured image corresponds to the second image, and then the determination unit determines that the captured image corresponds to the third image for the first time, the processing unit identifies the occupant based on the captured image, and executes a service set in advance for each occupant based on an identification result.

4. The occupant monitoring device according to claim 2, wherein
the occupant parameter includes a position of the center of an eyeball of the occupant in a three-dimensional model representing a structure including a three-dimensional shape of the face of the occupant.

5. The occupant monitoring device according to claim 2, wherein
the determination unit determines whether the captured image acquired by the acquisition unit corresponds to at least the first image or the second image based on a learned model generated by learning a learning image including information similar to the captured image and whether the learning image corresponds to at least the first image or the second image through machine learning.

6. The occupant monitoring device according to claim 1, wherein
the acquisition unit successively acquires the captured image a plurality of times, and
in a case where the determination unit determines that the captured image corresponds to the second image, and then the determination unit determines that the captured image corresponds to the third image for the first time, the processing unit identifies the occupant based on the captured image, and executes a service set in advance for each occupant based on an identification result.

7. The occupant monitoring device according to claim 6, wherein
the occupant parameter includes a position of the center of an eyeball of the occupant in a three-dimensional model representing a structure including a three-dimensional shape of the face of the occupant.

8. The occupant monitoring device according to claim 6, wherein
the determination unit determines whether the captured image acquired by the acquisition unit corresponds to at least the first image or the second image based on a learned model generated by learning a learning image including information similar to the captured image and whether the learning image corresponds to at least the first image or the second image through machine learning.

9. The occupant monitoring device according to claim 1, wherein
the occupant parameter includes a position of the center of an eyeball of the occupant in a three-dimensional model representing a structure including a three-dimensional shape of the face of the occupant.

10. The occupant monitoring device according to claim 9, wherein
the determination unit determines whether the captured image acquired by the acquisition unit corresponds to at least the first image or the second image based on a learned model generated by learning a learning image including information similar to the captured image and whether the learning image corresponds to at least the first image or the second image through machine learning.

11. The occupant monitoring device according to claim 1, wherein
the determination unit determines whether the captured image acquired by the acquisition unit corresponds to at least the first image or the second image based on a learned model generated by learning a learning image including information similar to the captured image and whether the learning image corresponds to at least the first image or the second image through machine learning.

12. The occupant monitoring device according to claim 1, wherein
the occupant parameter includes a position of the center of an eyeball of the occupant in a three-dimensional model representing a structure including a three-dimensional shape of the face of the occupant.

13. The occupant monitoring device according to claim 1, wherein
the determination unit determines whether the captured image acquired by the acquisition unit corresponds to at least the first image or the second image based on a learned model generated by learning a learning image including information similar to the captured image and whether the learning image corresponds to at least the first image or the second image through machine learning.

14. An occupant monitoring method comprising:

an acquisition step of acquiring a captured image obtained by imaging a region in which there is a probability that a face of an occupant is present in a vehicle;

a determination step of determining whether the captured image acquired in the acquisition step corresponds to at least a first image not including a feature portion of the face of the occupant but including at least a part of a body of the occupant or a second image not including the body of the occupant; and a processing step of monitoring a state change of the face of the occupant based on the captured image, and switching whether or not an occupant parameter set for monitoring the state change of the face of the occupant is to be reset according to a determination result in the determination step, wherein the determining step determines whether the captured image corresponds to the first image, the second image, or a third image including the face of the occupant, in a case where the determination step determines that the captured image corresponds to the first image, the processing step further comprises holding the occupant parameter without detecting face information regarding the face of the occupant based on the captured image, in a case where the determining step determines that the captured image corresponds to the second image, the processing step further comprises resetting the occupant parameter without detecting the face information based on the captured image, and in a case where the determining step determines that the captured image corresponds to the third image, the processing step further comprises detecting the face information based on the captured image, and updating the occupant parameter.

* * * * *

UNITED STATES PATENT AND TRADEMARK OFFICE
CERTIFICATE OF CORRECTION

PATENT NO. : 11,048,952 B2
APPLICATION NO. : 16/580593
DATED : June 29, 2021
INVENTOR(S) : Shin Osuga et al.

It is certified that error appears in the above-identified patent and that said Letters Patent is hereby corrected as shown below:

On the Title Page

Item (72) add --Takeshi MATSUMURA, Toyota-shi, Aichi-ken (JP)--

Signed and Sealed this
Twenty-seventh Day of February, 2024

Katherine Kelly Vidal
*Director of the United States Patent and Trademark Office*